May 12, 1970
A. S. HART
3,512,015
ELECTRONIC CONTROL CIRCUITRY
Filed Dec. 12, 1966
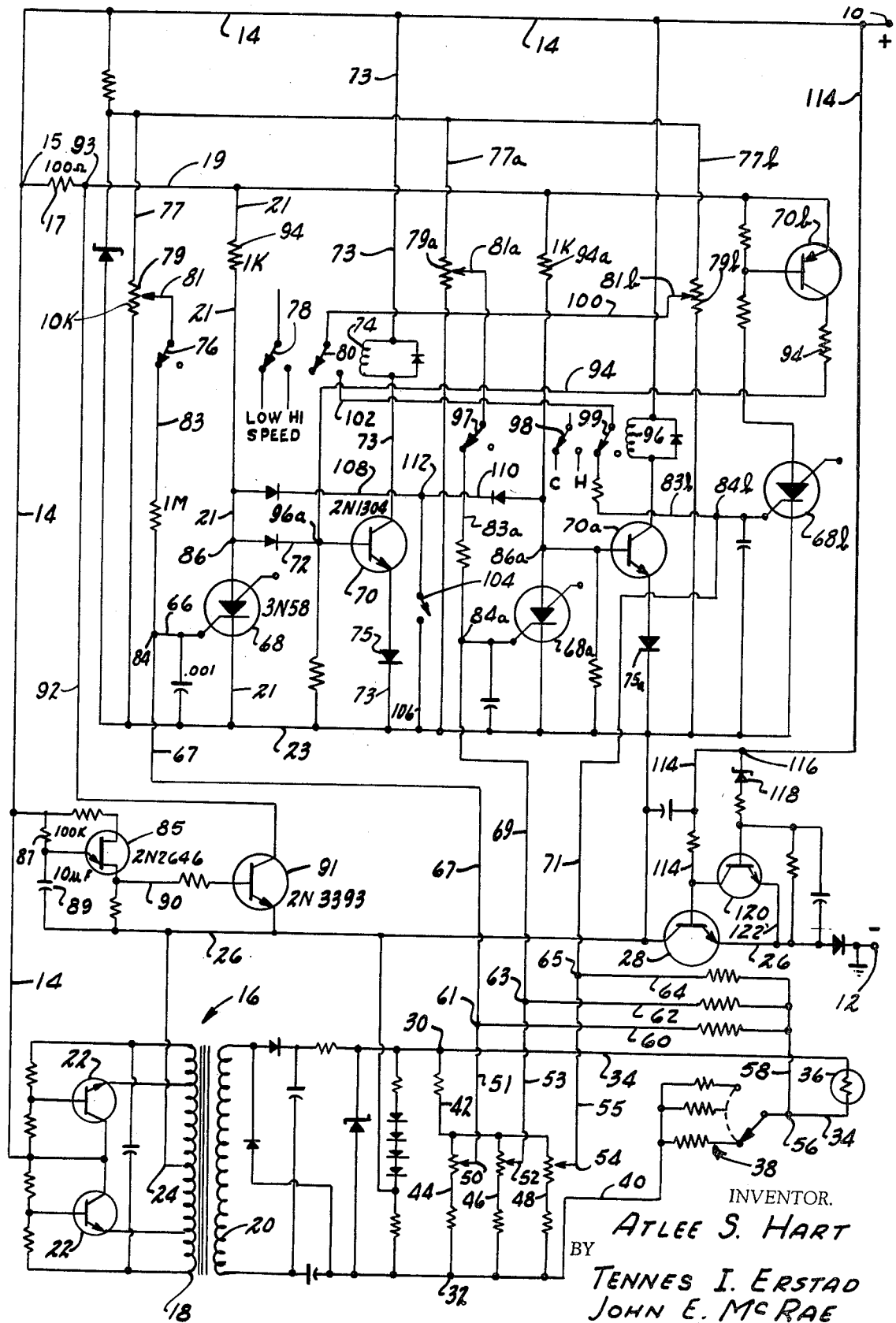
INVENTOR.
ATLEE S. HART
BY
TENNES I. ERSTAD
JOHN E. McRAE
ATTORNEYS United States Patent Office 3,512,015
Patented May 12, 1970

3,512,015
ELECTRONIC CONTROL CIRCUITRY
Atlee S. Hart, Oak Park, Mich., assignor to American Radiator & Standard Sanitary Corporation, New York, N.Y., a corporation of Delaware
Filed Dec. 12, 1966, Ser. No. 600,953
Int. Cl. H01h 47/02; H03k 17/00
U.S. Cl. 307—252                                4 Claims

ABSTRACT OF THE DISCLOSURE

Electronic control circuitry wherein three transistor control devices are so interconnected with two controlled relays as to provide four different relay output arrangements. Each control device preferably includes a turn-on circuit comprising an SCS, a pulse means for momentarily allowing the SCS to turn off, and a signal means controlled by a relay output for over riding the pulse means to turn the SCS on under certain conditions. Principal use of the circuitry is in the electrical control of heating and cooling equipment.

This invention relates to electronic control circuitry, and particularly to certain features of improvement in the circuits shown in copending application Ser. No. 434,412, filed Feb. 23, 1965, entitled "Condition Controller," and now abandoned.

One object of the present invention is to provide a simplified oscillation-driven capacitive discharge circuit for turning off a silicon controlled switch or similar device.

Another object is to provide an arrangement of three control devices interconnected with two relays so that said relays perform the control functions which would normally require three or more relays.

Another object is to provide a temperature controller having a temperature control adjustment means selectively movable to a multiplicity of different temperature settings, and an auxiliary switch controlled by the temperature adjustment means to lock out or lock in certain control devices associated with the adjustment means, the aim being to prevent selected ones of the control devices from exerting their normal control actions when the adjustment means is in a predetermined temperature setting.

An additional object is to provide an electronic circuit breaker for protection of solid state components against breakdown due to excessive voltage.

A general object is to provide control circuitry having improved operation and reduced manufacturing costs as compared with the circuitry disclosed in aforementioned application, Ser. No. 434,412.

In the drawings, the single figure is a circuit diagram of a controller utilizing features of the invention.

GENERAL ARRANGEMENT

The illustrated circuitry is designed to include two solenoid-actuated relays having coils 74 and 96. The controlled switch contacts 78 for coil 74 are arranged to energize an air circulating fan at high speed or low speed; i.e. in one position of the control switch the fan is on high speed, and in the other position of the control switch the fan is on low speed. The controlled switch contacts 98 for coil 96 are arranged to alternately energize an air heater or air cooler; i.e. in one position of the control switch the air heater is energized and in the other position of the control switch the air cooler is energized.

The fan and heater-cooler mechanism are arranged in a refrigerated compartment of a transport vehicle, such as a highway truck or railroad car, to maintain the vehicle contents at a preselected temperature. Such contents may comprise meat, vegetables, fish, milk, flowers or other contents which it is desired to maintain at a given temperature.

The aforementioned fan speed control and air heater-cooler control are interrelated to provide four different modes of operation, namely high fan speed heating, low fan speed heating, low fan speed cooling, and high fan speed cooling. Thermostatic means responding to vehicle compartment temperature is arranged to energize the two relays 74 and 96 accordingly as the compartment temperature strays from a preselected temperature setting. Thus, should the temperature drop appreciably below the temperature setting (e.g. two degrees) the control will go on high speed heating. As the temperature approaches nearer the temperature setting (e.g. to within one degree) the control will go on low speed heating. A slight rise in temperature above the setting will cause the control to go on low speed cooling. An appreciable rise in temperature above the setting will cause the control to go on high speed cooling. In most situations the control should cycle between low speed heating and low speed cooling. There is no completely off condition in the illustrated control.

Delving further into the mechanics of the control action, the temperature sensing is performed by a thermistor 36 located at a point in the air stream which is representative of the average temperature in the refrigerator compartment. The thermistor is disposed in one leg of a bridge circuit so that different sensed temperatures will result in different voltages at junction 56. A manually adjustable potentiometric resistance 38 is arranged in the bridge circuit to vary the potential at 56 independently of thermistor temperature; suitable indicia associated with resistance 38 enables the operator to dial the potentiometric arm to a desired temperature setting, as for example 40° F. or 22° F. etc.

Junction 56 is connected with three output signal lines 67, 69 and 71 which connect with three separate turn-on devices associated with the respective relay coils 74 and 96. Each turn-on device includes a silicon controlled switch having its cathode gate connected with one of lines 65, 67 or 69, and an anode-cathode circuit arranged to control an amplifier transistor 70 having its collector-emitter in a control circuit for one of the relay coils.

In the particular circuitry illustrated the individual silicon controlled switches are momentarily turned off at periodic intervals, as for example twice per second, so that each silicon controlled switch can sample the signal at its respective cathode gate. If the signal is above firing level the silicon controlled switch turns back on; the off interval is so short that the relay coil is not affected. If the gate signal is below firing level the silicon controlled switch remains off, in which case the relay coil goes into a new mode.

The signal lines 67, 69 and 71 are set at different voltages by manual sliders 50, 52 and 54. The signals rise and fall together with varying thermistor temperature so that each silicon controlled switch is turned on at a different thermistor temperature. Temperature differential between turn-on and turn-off for each silicon controlled switch (hereinafter termed an SCS) is effected by an auxiliary circuit which is energized by operation of the associated relay to transmit a second hold-on signal to the SCS cathode gate. This hold-on signal keeps the SCS on even though the signal in line 67, 69 or 71 is below firing level.

SIGNAL CIRCUITRY

The controller is provided with a source of positive potential, for example twelve volts DC, across terminals 10 and 12. Circuit line 14 at a high positive potential connects with the solid state DC to DC converter 16, said converter including a transformer having a primary winding 18 and a secondary winding 20. Suitable transistors 22 are provided in the transformer primary to supply the primary winding with an energizing current which is taken off of the winding through a center tap 24 connected to ground line 26. Line 26 includes the collector-emitter of a transistor 28 which is normally held on throughout the entire period of operation of the circuit. Transistor 28 is part of a circuit breaker (to be described later). For present purposes the circuit may be visualized as though transistor 28 were not present.

Secondary winding 20 of the transformer is connected with a bridge circuit having two junctions 30 and 32, junction 30 being the more positive. Current can flow in two separate paths between junctions 30 and 32. One path includes circuit line 34, thermistor 36, manually adjustable resistance 38, and line 40. The other path for current flow between junctions 30 and 32 includes line 42 and the three parallel branch lines 44, 46 and 48. In the presently contemplated use of the circuitry manual adjustments are made in resistances 38, 50, 52 and 54 so that junction 56 is more positive than any one of the sliders associated with resistances 50, 52 and 54. This enables a signal to flow from junction 56 through line 58 to three branch lines 60, 62 and 64. The various resistances are chosen so that positive potentials exist at junctions 61, 63 and 65. These positive potentials cause a small current flow from each junction 61, 63 or 65 through each respective line 51, 53 or 55 to each respective slider 50, 52 or 54, and eventually to junction 32. Sliders 50, 52 and 54 are adjusted so that the junction 61 potential is always slightly higher than the junction 63 potential, and the junction 63 potential is always slightly higher than the junction 65 potential. This enables three separate useful signal voltages to be applied to the signalling lines 67, 69 and 71. These voltages rise and fall together depending on the thermistor temperature and manual setting of resistance 38.

When the resistance 38 is adjusted to a low value the junction 56 potential will tend to lessen, thus requiring the thermistor to exhibit a lowered resistance before the desired junction 56 potential is attained. When resistance 38 is adjusted to a higher value the thermistor must exhibit an increased resistance before the desired junction 56 potential is reached. The resistance of the thermistor varies with temperature; accordingly for a given setting of resistance 38 the junction 56 potential will rise in response to rising thermistor temperatures. This enables manual adjustment of resistance 38 in a correct direction to vary the thermistor temperature necessary to attain a given signal level at junction 56.

The drawing shows the potentiometric arm for resistance 38 as movable to three positions or temperature settings; however it will be appreciated that in practice more or less than that number of settings may be employed. One embodiment of the invention employs twenty-eight settings spaced throughout the temperature range between −20° F. and +70° F. All of the control circuitry, with the exception of thermistor 36, is located remote from the refrigerated compartment.

CONTROL CIRCUIT FOR RELAY 74

The potential at junction 61 is applied to a line 67 which connects with a line 66 leading to the cathode gate of an SCS 68. When the potential at the cathode gate is sufficiently high the SCS will be fired on. The load circuit of the SCS includes line 14, junction 15, resistance 17, line 19, and branch line 21 containing the anode and cathode of the SCS. Line 21 connects with a line 23 which leads to the aforementioned ground line 26, said lines 23 and 26 both in effect being part of the same ground line and at the same substantially zero potential.

SCS 68 is part of the turn-on circuit for an amplifier transistor 70, so that the SCS, when fired, deprives the transistor of current through its base-emitter circuit. Thus, when the SCS is fired the potential at junction 86 is substantially less than that required by transistor 70, and transistor 70 is held off. When SCS 68 is turned off the potential at junction 86 rises and causes current to flow through line 72 and the base-emitter of transistor 70. This causes the collector-emitter of the transistor to be energized through a circuit which includes lines 14 and 73, relay coil 74 and diode 75. The relay coil pulls in an armature which actuates three switch arms 76, 78 and 80. The switches are shown in the positions occupied when the relay coil is de-energized.

Switch arm 76 is located in an auxiliary circuit which includes line 77, potentiometric resistance 79, manually adjustable slider 81 and line 83. Resistance 79 is adjusted by slider 81 such that when switch 76 is closed to connect lines 77 and 83, the defined auxiliary circuit will apply a predetermined hold-on differential current for the cathode gate of SCS 68. By way of illustration, if the line 67 signal should cause the SCS to fire at 40° F. slider 79 can be set to provide a signal in line 83 which will cooperate with the line 67 signal to keep the SCS on even though the temperature should drop below the 40° firing temperature. The differential between turn-on and turn-off may be set at different values by adjustment of slider 81.

In the circuitry of this invention SCS 68 is periodically turned off so that it can sample the current at junction 84 to be turned on again if the signal voltage at the cathode gate is sufficient. The turn off circuitry for the SCS comprises an oscillation driven capacitive discharge circuit including a unijunction transistor 85 connected with the positive voltage source line 14 through a resistance 87 and capacitance 89. Assuming that capacitance 89 is substantially fully discharged, the current from line 14 will flow through resistance 87 to charge the capacitance without turning on the uni-junction transistor. As the capacitor becomes charged it will be at a sufficient potential to send a momentary pulse of current through the emitter-base 1 circuit. This pulse will cause a pulse through the base 2-base 1 circuit, line 90, and the base-emitter of transistor amplifier 91. As soon as capacitance 89 is appreciably discharged the emitter potential will drop and the base 2-base 1 circuit of the uni-junction transistor will become non-conducting. Charging of the capacitance is then followed by another release of the charge through the emitter-base 1 circuit as before.

Depending on the values for resistance 87 and capacitance 89, there will be timed discontinuous pulses delivered through the base 2-base 1 circuit of the uni-junction transistor. These pulses will be conducted by line 90 to the base of the amplifier transistor 91, whose collector-emitter circuit is in an output pulse line 92 connected between junction 93 and ground line 26. As each amplified pulse flows through line 92 it short circuits the anode-cathode circuit of the SCS 68 since the resistance offered by the transistor 91 is much less than resistance 17 in the SCS anode-cathode circuit. When the pulse through line 92 is interrupted (by depletion of the charge in capacitance 89) the potential at junction 93 rises and SCS 68 is again forwardly biased. If the potential at the cathode gate is sufficient the SCS will turn back on. If cathode gate potential is insufficient, the SCS will remain off and the potential at junction 86 will rise, thus firing transistor 70 and energizing the relay coil 74. This will open switch 76 and condition the circuit for operation when the line 67 signal again reaches the firing level for the SCS.

In summary, when the line 67 voltage is below the firing level for SCS 68 the transistor 70 will be held on, thus energizing relay coil 74; switch 76 will be in the non-illustrated open position. When the thermistor temperature rises sufficiently to raise the line 67 voltage to a predetermined value, the SCS will be fired on to thus turn transistor 70 off, thereby de-energizing coil 74. Switch 76 will close the circuit between lines 77 and 83, thus causing the differential hold-on signal at junction 84 to be developed in accordance with the position of slider 81. Meanwhile the pulses in line 92 at about two per second (resulting from the continuous charging, discharging action of capacitor 89) will periodically deprive the SCS anode-cathode circuit of current. The SCS will turn off on each deprivation of current; however it will turn back on again if the signal at junction 84 is sufficient. The duration of the turn off period must be less than the time constant for relay 74; otherwise the relay coil will be energized to undesirably open switch 76.

CONTROL CIRCUIT FOR RELAY 96

This control circuit is initially energized by the signal from line 69. As previously noted, sliders 50, 52, and 54 are set so that the line 69 voltage is somewhat less than the line 67 voltage at any given condition of thermistor 36. Thus SCS 68a will turn on at a slightly higher temperature than SCS 68. When the line 69 signal is below firing level SCS 68a is off, and relay coil 96 is on, thus putting switch 98 in the heating mode. As the line 69 signal reaches firing level SCS 68a turns on, and relay 96 turns off, thus causing switch 98 to go into the cooling position, and switch 97 to go into the illustrated position for supplying a hold-on signal to the cathode gate of the SCS. The function of this hold-on circuit is the same as that of the previously described hold-on circuit. The different sliders 81 and 81a are independently adjustable so that the fan speed and heater-cooler combination switch from one mode to another at different turn-off temperatures.

CONTROL CIRCUIT ENERGIZED BY LINE 71 SIGNAL

The voltage in line 71 is slightly less than the voltage in line 69 so that the circuit controlled by line 71 will be the last to fire, assuming we are going from a low temperature to a higher temperature. The control circuit fires SCS 68b, which then forms a conductive path for the emitter-base of transistor 70b. The emitter-collector for 70b then sends an amplified signal through line 94 to junction 96a. This supplies current for the base-emitter of transistor 70 irrespective of the condition of SCS 68. Thus, even though SCS 68 might be in a condition to deprive transistor 70 of current, suitable current can be furnished the transistor by transistor 70b. The circuit energized by the line 71 signal serves an override on the control circuit energized by line 67. In this way the two relay coils 74 and 96 can be energized in different combinations to perform the work which would otherwise require three or more coils.

The overriding control is only required to operate under certain conditions, principally high speed cooling. Therefore the hold-on circuit for the override control preferably cuts in only when relay coils 74 and 96 are in certain conditions. Thus, the hold-on circuit for SCS 68b includes line 77b, slider 81b, line 100, switch 80, line 102, switch 99 and line 83b. Unless switches 80 and 99 are both in certain positions (high speed cool) there will be no operating hold-on circuit for SCS 68b. This also insures that the override control will only have a differential signal applied to junction 84b after SCS 68b has been initially fired on by the line 71 signal; i.e. the differential signal will not be in the circuit originally to interfere with control by line 71.

RELAY ARRANGEMENT

The relay coils are arranged to be energized and de-energized in different temperature ranges according to the adjusted positions of resistance 38, and sliders 50, 52, 54, 81 and 81a and 81b. In an illustrative arrangement the sliders 50, 52 and 54 might be set so that lines 67, 69 and 71 would turn on their respective SCS's at different temperatures spread apart by one thermal degree. Sliders 81, 81a and 81b might be adjusted so that each SCS remained on for one thermal degree drop in temperature. If resistance 38 was then turned to a temperature seting of 30° F. we might have a cycle represented by the following chart:

| Thermistor Temp. | SCS 68 | SCS 68a | SCS 68b | Fan Speed Relay 74 | Heat-Cool Relay 96 | Differential Signal On |
|---|---|---|---|---|---|---|
| 32–31 | On | On | On | Hi | Cool | 79a, 79b. |
| 31–30 | On | On | Off | Low | Cool | 79, 79a. |
| 30–29 | On | Off | Off | Low | Heat | 79. |
| 29–28 | Off | Off | Off | Hi | Heat | None. |

In the above example SCS 68 would be on at temperatures above 29°, SCS 68a would be on at temperatures above 30°, and SCS 68b would be on at temperatures above 31°. The hold-on signals at 79, 79a and 79b would be effective only in the presence of dropping thermistor temperatures, since with rising thermistor temperatures the turn-on signals are effective by themselves to keep the respective SCS turned on. It will be understood that the spread between the various turn-on temperatures and the differential between turn-on and turn-off of each transistor can be varied to provide different cycles suited to different types of heating or cooling equipment.

HEAT LOCK-OUT SWITCH

When the expected sensed temperatures are entirely in a low range it may not be necessary or desirable to energize the heater. Thus, when a vehicle is transporting produce which is to be maintained at 0° F. it may be be desirable to eliminate the high speed heating and low speed heating modes. The control would then cycle between low speed cooling and high speed cooling.

To lock out the heating modes there may be provided a switch 104 located in a short circuit line 106. This switch may be mechanically interconnected with the adjustment mechanism for potentiometric 38 so that when the mechanism is in any one of a prescribed number of low temperature settings the switch 104 is closed. The interconnection can be a cam arranged to pass over the switch 104 actuator, or a positionment of the switch 104 contacts at a designated point in the path of the potentiometric slider arm; at high temperature settings the switch contacts can be opened to let the control include the heating modes.

Assuming that switch 104 is closed, a short circuit will be created around transistor 70 in the line comprising 108, junction 112, and line 106. A second short circuit will be created around transistor 70a in the line comprising line 110, junction 112 and line 106. Therefore transistors 70 and 70a will remain off even though SCS's 68 and 68a would want them to turn on. In effect coils 74 and 96 will remain in the low speed cooling mode whatever the signal levels in lines 67 and 69. However a proper signal in line 71 will cause transistor 70 to be turned on by a circuit comprising transistor 70b, line 94, the right portion of line 72, the base-emitter of 70, line 73 and diode 75. Transistor 70 will energize coil 74 into the high speed mode, thus giving high speed cooling when the signal in line 71 is at a proper level.

By eliminating line 110 it is possible to eliminate only the high speed heating function. Thus there would be retained low speed heating, low speed cooling and high speed cooling. Other short circuiting line arrangements could be devised to eliminate selected ones of the four possible modes in different adjusted positions of temperature adjustment device 38.

CIRCUIT BREAKER

Previous description has treated the circuit as though transistor 28 were not present. Assuming that transistor is present, under normal voltage conditions a circuit will be completed from terminal 10 through line 114, the base-emitter of transistor 28, and the right portion of line 26. This will allow current to flow through the collector-emitter and main load in the normal fashion previously contemplated. In the event of voltage overload a current will flow from junction 116 through Zener diode 118, the base-emitter of transistor 120, line 122, and the right portion of line 26. This will cause the collector-emitter of transistor 120 to short circuit the base-emitter of 28, thus turning off 28 and protecting the load represented by the remaining circuitry. Removal of the overvoltage condition will cause the Zener diode to interrupt the short circuit, thus enabling the normal load circuit to be contemplated.

FEATURES OF THE INVENTION

The general circuit herein disclosed is quite similar to the circuit shown in FIG. 2 of the aforementioned patent application, Ser. No. 434,412. One feature of improvement is in the turn-off circuitry for the SCS's. The present arrangement turns off each SCS by merely removing the forward bias on each anode-cathode circuit, whereas the previous arrangement applied a reverse bias on the anode-cathode circuit. The present arrangement eliminates each capacitor 128 and associated diode required in the previous arrangement, thus providing some cost reduction.

The present arrangement also utilizes a hook-up of relays and control devices which permits two relays to perform the functions otherwise performed by three or more relays. The use of switches 80 and 99 in a hold-on circuit for the third SCS provides a low cost way of allowing transistor 70b to energize transistor 70 in an override action to the normal action dictated by transistor 68. By this operation it is possible to economize on relays while still obtaining the desired multiplicity of heating-cooling modes.

A further feature of improvement is the lock-out switch 104 which permits selective elimination of the heating or cooling modes when the temperature adjustment mechanism 38 is in selected temperature settings.

A final feature of improvement is the solid state circuit breaker provided by transistors 28 and 120, and Zener diode 118.

It will be appreciated that variations in arrangement and design can be resorted to without departing from the spirit of the invention as encompassed by the appended claims.

It is claimed:

1. In combination: three control devices, each including a transistor having its collector-emitter circuit constituting the output line for the respective control device; each control device further including a turn-on circuit for the respective transistor; a first relay controlled by the transistor output line in the first control device; a second relay controlled by the transistor output line in the second control device; said third control device having its output line connected with the turn-on circuit in the first control device to provide a control for the first transistor which overrides the first turn-on circuit when the third control device is energized; the turn-on circuit for the third control device including a first set of contacts controlled by the first relay and a second set of contacts controlled by the second relay.

2. The combination of claim 1 wherein each of the turn-on circuits for the three control devices includes an SCS having its cathode gate adapted to receive an input signal voltage; the combination further comprising pulse means for periodically removing the forward bias from the anode-cathode of each SCS to momentarily turn said SCS off; a first hold-on differential signal means controlled by the first relay for application to the cathode gate of the first SCS to cooperate with the associated turn-on signal voltage in controlling the turn-off action; and a second hold-on differential signal means controlled by the second relay for application to the cathode gate of the second SCS to cooperate with the associated turn-on signal voltage in controlling the second SCS turn-off action.

3. The combination of claim 2 and further comprising a third hold-on differential signal means controlled jointly by the first and second relays for application to the cathode gate of the third SCS to cooperate with the associated turn-on signal voltage in controlling the third SCS turn-off action.

4. In combination: temperature sensing means operable to deliver a signal voltage proportional to variations in sensed temperature; temperature control adjustment means movable to a multiplicity of different temperature settings to vary the signal voltage developed for any given sensed temperature; individual signal lines connected with the manual adjustment means to receive the signal lines voltage; each signal line having means associated therewith for modifying the signal voltage so that for any given sensed temperature each signal line enjoys a different potential at its output terminal; a multiplicity of control devices operated by variations in potential in each respective signal line to normally exert a controlling action on an instrumentality which affects the temperature being sensed; and an auxiliary switch controlled by the temperature adjustment means, said switch being connected with specified ones of the control devices so that selected ones of the control devices are prevented from exerting their normal control actions when the adjustment means is at a predetermined temperature setting; each control device including a transistor and an SCS controlling the turn-on action for the transistor; each SCS having its cathode gate connected with the signal line, and its anode-cathode connected as a short circuit around the transistor emitter-base circuit whereby the SCS normally turns on to turn the transistor off; said auxiliary switch being connected as a second short circuit so that the transistor can be turned off by the SCS or the auxiliary switch.

References Cited

UNITED STATES PATENTS 3,340,407 9/1967 Senclair _____ 317—139
3,364,391 1/1968 Jensen _____ 317—148.5

JOHN S. HEYMAN, Primary Examiner

B. P. DAVIS, Assistant Examiner

US. Cl. X.R.

307—239, 305; 317—139, 148.5; 323—22; 328—3